US010671850B2

(12) United States Patent
Kazui (10) Patent No.: US 10,671,850 B2
(45) Date of Patent: Jun. 2, 2020

(54) VIDEO IMAGE RECOGNITION APPARATUS, VIDEO IMAGE RECOGNITION METHOD, AND STORAGE MEDIUM

(71) Applicant: CANON KABUSHIKI KAISHA, Tokyo (JP)

(72) Inventor: Masato Kazui, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 222 days.

(21) Appl. No.: 15/864,899

(22) Filed: Jan. 8, 2018

(65) Prior Publication Data
US 2018/0204067 A1  Jul. 19, 2018

(30) Foreign Application Priority Data

Jan. 13, 2017 (JP) ................... 2017-004680

(51) Int. Cl.
*G06K 9/00* (2006.01)
*G06K 9/62* (2006.01)
*G06K 9/78* (2006.01)

(52) U.S. Cl.
CPC ..... *G06K 9/00718* (2013.01); *G06K 9/00221* (2013.01); *G06K 9/00335* (2013.01); *G06K 9/00369* (2013.01); *G06K 9/6256* (2013.01); *G06K 9/6262* (2013.01); *G06K 9/78* (2013.01); *G06K 2209/21* (2013.01)

(58) Field of Classification Search
CPC ............. G06K 9/00718; G06K 9/6256; G06K 9/00221; G06K 9/78; G06K 9/00335; G06K 2209/21; G06K 9/00369; G06K 9/6262; G06K 9/00711; G06K 9/6269
See application file for complete search history.

(56) References Cited

U.S. PATENT DOCUMENTS

| 8,977,001 B2 * | 3/2015 | Yu ...................... | G06K 9/00771 348/169 |
| 2015/0363670 A1 * | 12/2015 | Sugishita ............... | H04N 7/181 382/155 |
| 2018/0150725 A1 * | 5/2018 | Tate .................... | G06K 9/00624 |
| 2019/0246041 A1 * | 8/2019 | Blott .................. | G06K 9/00624 |
| 2019/0246075 A1 * | 8/2019 | Khadloya .......... | G06K 9/00302 |

FOREIGN PATENT DOCUMENTS

JP    2007-219865 A    8/2007

OTHER PUBLICATIONS

Adrien Gaidon et al.; "Self-Learning Camera: Autonomous Adaptation of Object Detectors to Unlabeled Video Streams;" arXiv: 1406.4296v2 [cs.CV], Jun. 18, 2014; pp. 1-9.
Navneet Dalal et al.; " Histograms of Oriented Gradients for Human Detection;" CVPR2005 (IEEE Computer Vision and Pattern Recognition), vol. 1, pp. 886-893.

* cited by examiner

*Primary Examiner* — Wesley J Tucker
(74) *Attorney, Agent, or Firm* — Canon U.S.A., Inc. IP Division

(57) ABSTRACT

An apparatus includes an analysis unit configured to analyze a state of an environment at a time when a capturing unit captures a video image, based on a parameter for correcting the captured video image, a recognition unit configured to perform recognition processing on the captured video image, using a classifier, and a learning unit configured to learn the classifier based on a result of the analysis performed by the analysis unit and a result of the recognition performed by the recognition unit.

18 Claims, 10 Drawing Sheets

| | | CAUSE OF INCORRECT DETECTION | JUDGEMENT BY AF/AE | UPDATE PROCESSING |
|---|---|---|---|---|
| PERSON DETECTED | CORRECT DETECTION TP | | JUDGEMENT THAT SUBJECT IS PRESENT & Ev VALUE < Th_low (THERE IS POSSIBILITY OF BLOWN OUT HIGHLIGHTS IN PERSON REGION) & Ev VALUE > Th_high (THERE IS POSSIBILITY OF BLOCKED UP SHADOWS IN PERSON REGION) | PERFORM ADDITIONAL LEARNING OF FEATURE OF PERSON AT THE TIME OF LOW ILLUMINANCE AND LUMINANCE SATURATION |
| | INCORRECT DETECTION FP | BACKGROUND DESIGN, IMAGE OF PERSON, SUBJECT OTHER THAN PERSON | JUDGEMENT THAT SUBJECT IS NOT PRESENT | PERFORM ADDITIONAL LEARNING TO REDUCE INCORRECT DETECTION |
| PERSON UNDETECTED | CORRECT UNDETECTION TN | | JUDGEMENT THAT SUBJECT IS NOT PRESENT | PERFORM NO ADDITIONAL LEARNING |
| | DETECTION OMISSION FN | BLOWN OUT HIGHLIGHTS AND BLOCKED UP SHADOWS IN PERSON REGION DUE TO ILLUMINATION VARIATION | JUDGEMENT THAT SUBJECT IS PRESENT & Ev VALUE < Th_low (THERE IS POSSIBILITY OF BLOWN OUT HIGHLIGHTS IN PERSON REGION) OR Ev VALUE > Th_high (THERE IS POSSIBILITY OF BLOCKED UP SHADOWS IN PERSON REGION) | INCREASE SENSITIVITY OF PERSON DETECTOR |

| | | CAUSE OF INCORRECT DETECTION | JUDGEMENT BY AF/AE | UPDATE PROCESSING |
|---|---|---|---|---|
| ABNORMAL MOVEMENT DETECTED | CORRECT DETECTION TP | | | |
| | INCORRECT DETECTION FP | DETECT AMBIENT LIGHT VARIATION AND SPECULAR REFLECTION AS ABNORMAL MOVEMENT | JUDGEMENT THAT SUBJECT IS PRESENT & THERE IS Ev VARIATION | PERFORM ADDITIONAL LEARNING FOLLOWING BRIGHTNESS VARIATION |
| | | | JUDGEMENT THAT SUBJECT IS NOT PRESENT & THERE IS SUDDEN EV CHANGE | PERFORM ADDITIONAL LEARNING TO REDUCE INCORRECT DETECTION |
| ABNORMAL MOVEMENT UNDETECTED | CORRECT UNDETECTION TN | | JUDGEMENT THAT SUBJECT IS NOT PRESENT | PERFORM NO ADDITIONAL LEARNING |
| | DETECTION OMISSION FN | THERE IS LITTLE MOTION INFORMATION (TIME-SPACE LUMINANCE GRADIENT) AT THE TIME OF LOW ILLUMINATION | JUDGEMENT THAT SUBJECT IS PRESENT & Ev VALUE << Th_low (ENTIRE SCENE IS EXTREMELY DARK) | INCREASE MOVEMENT DETECTION SENSITIVITY |

FIG.10

VIDEO IMAGE RECOGNITION APPARATUS, VIDEO IMAGE RECOGNITION METHOD, AND STORAGE MEDIUM

BACKGROUND OF THE INVENTION

Field of the Invention

The aspect of the embodiments relates to a technique for recognizing an input video image.

Description of the Related Art

In recent years, techniques using autonomous learning have drawn attention in the field of video image recognition using machine learning. In autonomous learning, for example, a classifier acquires feedback information from an environment, and autonomously updates a learning database and performs additional learning or re-learning. A. Gaidon, G. Zen, and J. A. Rodriguez-Serrano, "Self-Learning Camera: Autonomous Adaptation of Object Detectors to Unlabeled Video Streams", arXiv:1406.4296v2 [cs.CV] 18 Jun. 2014 discusses a method for improving person detection performance by causing a classifier to autonomously learn person detection and generating based on an initial classifier a new classifier having different characteristics.

When video image recognition such as person detection and person movement recognition is performed, the performance of the video image recognition depends significantly on the illumination state of the environment in which images are captured. However, in the method discussed in A. Gaidon, G. Zen, and J. A. Rodriguez-Serrano, "Self-Learning Camera: Autonomous Adaptation of Object Detectors to Unlabeled Video Streams", arXiv:1406.4296v2 [cs.CV] 18 Jun. 2014, re-learning of the classifier using a result of illumination variation analysis of the environment in which image capturing is not performed. Thus, with the method, it has been difficult to recognize video images with high accuracy without being affected by illumination variations in the environment in which image capturing is performed. Therefore, an aspect of the embodiments, which is directed to a technique that enables highly accurate video image recognition without being affected by illumination variations in an environment in which image capturing is performed, is sought.

SUMMARY OF THE INVENTION

According to an aspect of the embodiments, an apparatus includes an analysis unit configured to analyze a state of an environment at a time when a capturing unit captures a video image, based on a parameter for correcting the captured video image, a recognition unit configured to perform recognition processing on the captured video image, using a classifier, and a learning unit configured to learn the classifier based on a result of the analysis performed by the analysis unit and a result of the recognition performed by the recognition unit.

Further features of the disclosure will become apparent from the following description of exemplary embodiments with reference to the attached drawings.

DESCRIPTION OF THE EMBODIMENTS

In video image recognition processing for detecting persons from video images and recognizing movements and actions of the persons, feature amounts related to person recognition, such as silhouettes of the persons, textures such as clothes, and motion patterns, are in general extracted from the video images. Then, the feature amounts are passed through a classifier to perform person detection and person movement recognition. In many cases, however, it is difficult to stably acquire the person feature amounts due to variations in illumination conditions. More specifically, when the exposure and white balance of a subject region which is a detection target are inappropriate or changed, the performance of video image recognition decreases. In person detection, when the background of a scene is dark, an attempt to adjust the entire scene to an appropriate exposure by auto exposure (AE) control often leads to overexposure of a person region to generate blown out highlights of textures such as faces and clothes, and this causes a situation of unsuccessful person detection.

In a first exemplary embodiment of the disclosure, whether a result of person detection is correct (incorrect detection judgment) and whether a person is undetected when the person is present (non-detection judgment) are judged based on waveforms of an exposure value (Ev) and an auto focus (AF) evaluation value of a camera. Then, additional learning of a classifier is performed based on the judgment information.

Further, in person movement recognition, derivative values of video image signals in space and time directions are analyzed, and when the scene is dark, the derivative value calculation becomes unstable to cause a situation that the performance of movement recognition decreases. This situation of a decrease in movement recognition performance also occurs when the brightness in a video image varies significantly due to outside light incidence, specular reflection of the incident light, movement of a person under discontinuously arranged illuminations, a variation in the area of a person region, etc.

Thus, in a second exemplary embodiment, variations in brightness of a video image due to low luminance, sudden change in ambient light, and person movement are estimated based on a judgment of whether the exposure value is outside an appropriate range, analysis of temporal variations in the exposure value, and analysis of the waveform of the AF evaluation value, and additional learning of a classifier is performed based on the estimation information. To estimate contexts between the environment, illumination, and person, a video image recognition method is used as scene analysis, and the context information can be estimated with a reduced amount of calculation compared to conventional techniques by analyzing video image adjustment parameters acquired from an image capturing unit. Further, in conventional machine learning, a learning database is to be configured to include as many illumination variations as possible at the time of learning a classifier so that the classifier is applicable to the illumination variations. Especially in video image recognition using deep learning which is increasingly put into practical use in recent years, the database scale is so large that it is difficult to configure an initial database with a required scale for learning. According to the exemplary embodiment, however, an autonomous learning unit which requires no large-scale database is realized with a reduced amount of calculation.

Various exemplary embodiments of the present disclosure will be described in detail below.

The first exemplary embodiment of the disclosure will be described in detail below with reference to the drawings. In the present exemplary embodiment, an example of video image recognition will be described in which a person region is detected from an input video image.

Figure 1:
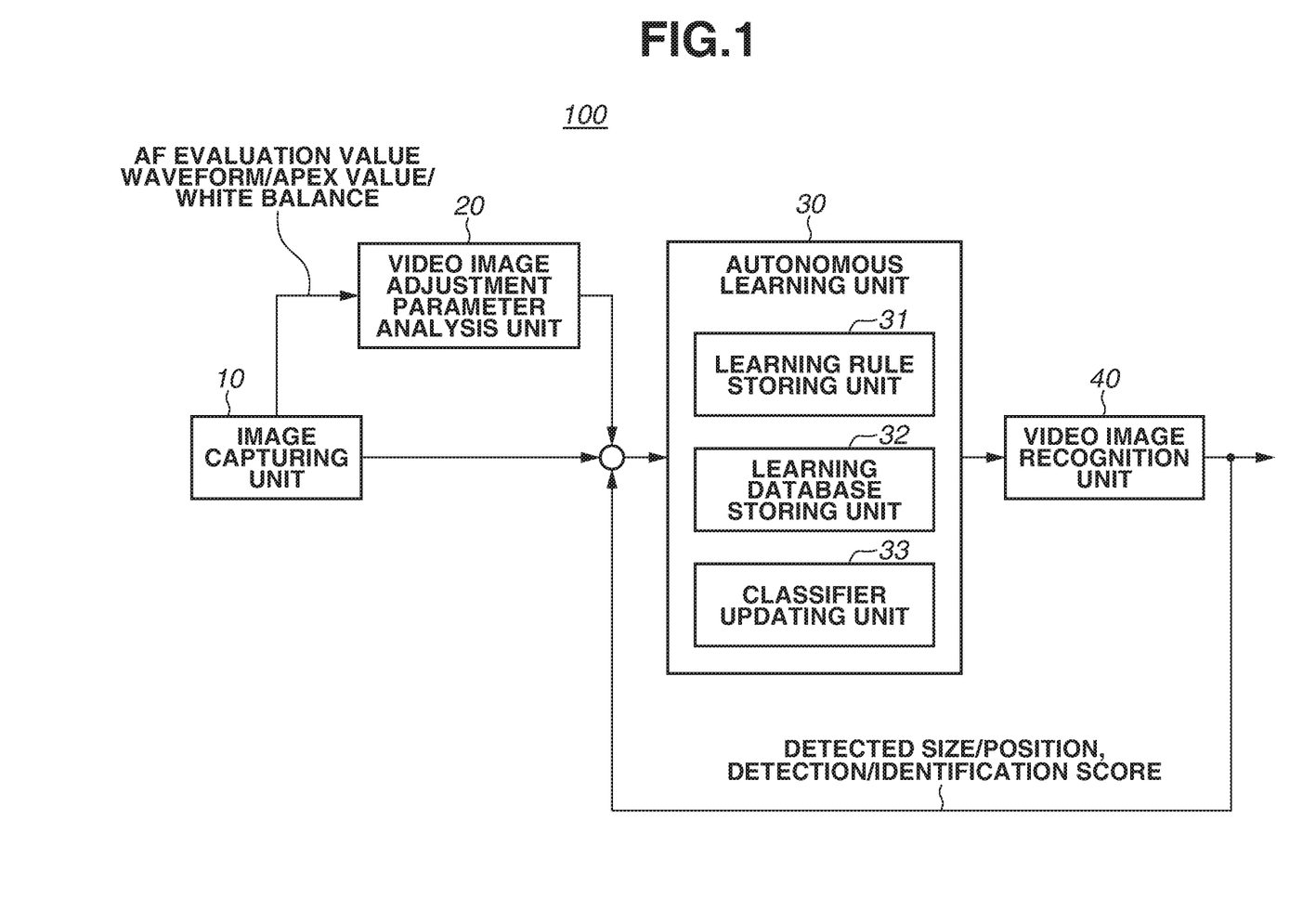
FIG. 1 is a block diagram illustrating the functional configuration of a video image recognition apparatus according to a first exemplary embodiment.

FIG. 1 is a block diagram illustrating the functional configuration of a video image recognition apparatus according to the present exemplary embodiment. As illustrated in FIG. 1, a video image recognition apparatus 100 includes an image capturing unit (camera) 10, a video image adjustment parameter analysis unit 20, an autonomous learning unit 30, and a video image recognition unit 40. Further, the autonomous learning unit 30 includes a learning rule storing unit 31, a learning database storing unit 32, and a classifier updating unit 33.

Except for the image capturing unit 10, the video image recognition apparatus 100 includes hardware such as a central processing unit (CPU), a read-only memory (ROM), a random access memory (RAM), and a hard disk drive (HDD), and the CPU executes a program stored in the ROM, the HDD, etc. to realize, for example, a functional configuration or a process illustrated in a flowchart described below. The RAM includes a storage region which functions as a work area where the CPU develops and executes the program. The ROM includes a storage region for storing programs to be executed by the CPU, etc. The HDD includes a storage region for storing various programs for the CPU to execute processing and various types of data including threshold value data.

The image capturing unit 10 captures scene images on which recognition such as person detection is to be performed, and transmits video image signals of the captured images to the autonomous learning unit 30. Further, video image adjustment parameters are output to the video image adjustment parameter analysis unit 20. The video image adjustment parameters are determined based on the state (indoor, outdoor, background color) of the scene captured by the image capturing unit 10, illumination conditions, presence/absence of persons, and methods of adjusting and correcting video images of the camera.

The video image adjustment parameters include additive system of photographic exposure (APEX) values for AE control and a waveform of an AF evaluation value for AF control. The video image adjustment parameters further include a color balance for auto white balance. The APEX values include a light value (Lv), exposure value (Ev), and film sensitivity (sensitivity value) (charge-coupled-device (CCD)/complementary-metal-oxide-semiconductor (CMOS) sensitivity (Sv). The APEX values further include a subject luminance (brightness value) (Bv), lens aperture (aperture value) (Av), and shutter speed (time value) (Tv).

AE, AF, and AWB for automatic adjustment and correction of video images of the camera are sometimes referred to as 3A (or camera 3A) using the initials of AE, AF, and AWB. While the example in which the image capturing unit 10 is included in the video image recognition apparatus 100 is described in the present exemplary embodiment, the image capturing unit 10 can be separated from the video image recognition apparatus 100. More specifically, for example, video images captured by a monitoring camera are input to the video image recognition apparatus 100 via a network, etc., and the video image recognition apparatus 100 performs video image recognition on the input video images.

The video image adjustment parameter analysis unit 20 performs threshold value processing and temporal variation analysis on the video image adjustment parameters output from the image capturing unit 10 and performs subject presence judgment processing based on results of the threshold value processing and the temporal variation analysis to analyze the state of the environment in which the image capturing unit 10 captures the video images. The result of the analysis performed by the video image adjustment parameter analysis unit 20 is transmitted to the autonomous learning unit 30. The analysis result can be shared with other video image recognition apparatuses via the network.

The autonomous learning unit 30 receives as input the parameter analysis result transmitted from the video image adjustment parameter analysis unit 20, the video image signals transmitted from the image capturing unit 10, and a person detection result transmitted from the video image recognition unit 40. Then, additional learning of the classifier which performs video image recognition is performed at the classifier updating unit 33 using the above-described information as input based on autonomous learning rules stored in a learning rule memory. At this time, the result of recognition performed by the video image recognition unit 40 is input so that the result of recognition performed by the video image recognition unit 40 is sequentially added to the learning database storing unit 32.

The learning rule storing unit 31 stores the rules (processes and conditional branches) for autonomous learning. The learning rules are to be defined for each recognition target. While the learning rules for person detection are defined in the present exemplary embodiment, the recognition target can be any other object such as an animal or car. Further, the recognition task is not limited to the person detection and can be other video image recognition such as person movement recognition or scene recognition, and in such cases, learning rules for autonomous learning of person movement recognition or scene recognition can be prepared.

The learning database storing unit 32 is a database for learning the classifier for video image recognition. A large-scale database applicable to various image-capturing environments can be configured, but in general it is very difficult to configure such a database, so it is sufficient to configure a minimum database which is applicable to the environment in which the image capturing unit 10 is situated. For example, if the height of the location of the camera and the depression angle of the camera are determined, only video images captured under a similar camera location condition are gathered to configure the database.

The classifier updating unit 33 performs additional learning or re-learning using as feedback information the recognition result transmitted from the video image recognition unit 40 on the classifier learned using an initial learning database. The classifier in the present exemplary embodiment is configured such that a person region is detectable with the classier such as a support vector machine (SVM) classifier or an adaptive boosting (AdaBoost) classifier using as input a histograms-of-oriented-gradients (HOG) feature amount extracted from the video images (images) included in the learning database (refer to N. Dalal, B. Triggs, "Histograms of Oriented Gradients for Human Detection", CVPR2005 (IEEE Computer Vision and Pattern Recognition), Vol. 1, pp. 886-893, 2005). The video image recognition unit 40 performs person detection, etc. from the video images captured by the image capturing unit 10 using the classifier updated by the autonomous learning unit 30.

Figure 2:
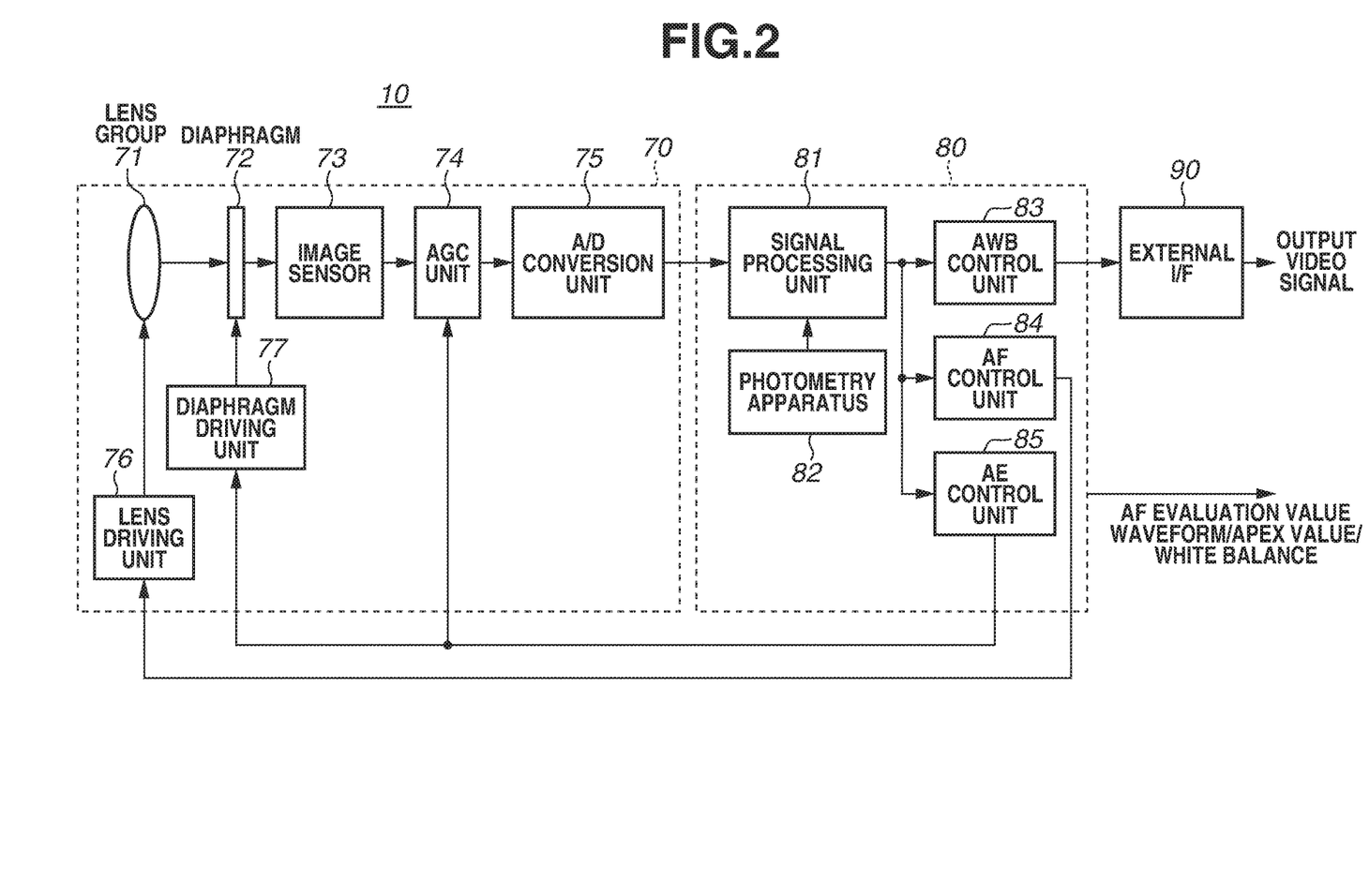
FIG. 2 is a block diagram schematically illustrating an image capturing unit according to the first exemplary embodiment.

FIG. 2 is a block diagram schematically illustrating the image capturing unit 10 according to the present exemplary embodiment. The image capturing unit 10 includes a video image signal generation unit 70, a video image signal development unit 80, and an external interface (I/F) 90. The video image signal generation unit 70 includes a lens group 71, a diaphragm 72, an image sensor 73, an automatic gain control (AGC) unit 74, an analog/digital (A/D) conversion unit 75, a lens driving unit 76, and a diaphragm driving unit 77. The lens group 71 is an optical system for focusing (forming an image of) light from a subject onto the image sensor 73. The lens group 71 includes a focus lens for focusing on the subject and a zoom lens for adjusting the angle of view.

The amount of light (of optical image) having passed through the lens group 71 is adjusted at the diaphragm 72. The optical image having passed through the diaphragm 72 is formed on a light receiving surface of the image sensor 73. On the light receiving surface of the image sensor 73 are arranged color filters arrayed in predetermined order. The image sensor 73 outputs an electric signal (analog signal) corresponding to the optical image. The analog signal output from the image sensor 73 is transmitted to the AGC 74, and the gain of the analog signal is adjusted at the AGC 74 to adjust the luminance of the analog signal. The output of the AGC 74 is A/D converted at the A/D conversion unit 75 and output as a digital signal (digital image-capturing signal). The lens driving unit 76 controls and drives the lens group 71 to perform focusing in response to an instruction from an AF control unit 84 described below. The diaphragm driving unit 77 controls the diaphragm 72 based on an instruction from an AE control unit 85 described below.

The video image signal development unit 80 includes a signal processing unit 81, a photometry apparatus 82, an AWB control unit 83, the AF control unit 84, and the AE control unit 85. The signal processing unit 81 performs pre-processing for the AWB control unit 83, the AF control unit 84, and the AE control unit 85 and performs calculation for AE control based on an exposure value Ev transmitted from the photometry apparatus 82.

The AWB control unit 83 performs processing to adjust the white balance of a scene, and if an originally-white (gray) region is colored, the AWB control unit 83 applies a white balance correction gain (correction value) to turn the region white.

The AF control unit 84 transmits a control signal to the lens driving unit 76 to focus on a major subject in the scene. While contrast AF is used as an example in the present exemplary embodiment, the functions provided by the present exemplary embodiment are also realizable by phase difference AF. Contrast AF is a method in which a focus adjustment lens is moved to search for a high-contrast portion based on a video image formed on an image sensor and the high-contrast region is focused. In contrast AF, an AF evaluation value (contrast) is given with respect to each position of a focus lens, and a peak point of the AF evaluation values is determined to focus on the subject. In the present exemplary embodiment, the waveform of the AF evaluation value is transmitted to the video image adjustment parameter analysis unit 20 to realize updating of the classifier as appropriate for the image-capturing environment.

The AE control unit 85 controls the diaphragm driving unit 77 such that the state (distributions of color and luminance in the scene) of the captured scene is taken into consideration to capture a video image with appropriate exposure. The lens aperture is calculated from a relational formula ($Ev=Sv+Bv=Av+Tv$) between the exposure value Ev, film sensitivity Sv (CCD/CMOS sensitivity), Bv (subject luminance), Av (lens aperture), and Tv (shutter speed). Ev, Sv, Bv, Av, and Tv are referred to as APEX units, and physical amount elements (subject luminance, sensitivity, lens aperture, shutter speed) for exposure control are converted into units of the same dimension to obtain an exposure value through simple addition/subtraction processing. The calculated exposure value Ev is transmitted to the video image adjustment parameter analysis unit 20.

The external I/F 90 is an interface unit for external output and outputs the video image signals to the autonomous learning unit 30. Further, in the case in which the image capturing unit (camera) 10 is separated from the video image recognition apparatus 100, video images captured by the image capturing unit 10 are output to the video image recognition apparatus 100 via the external I/F 90.

Figure 3A:
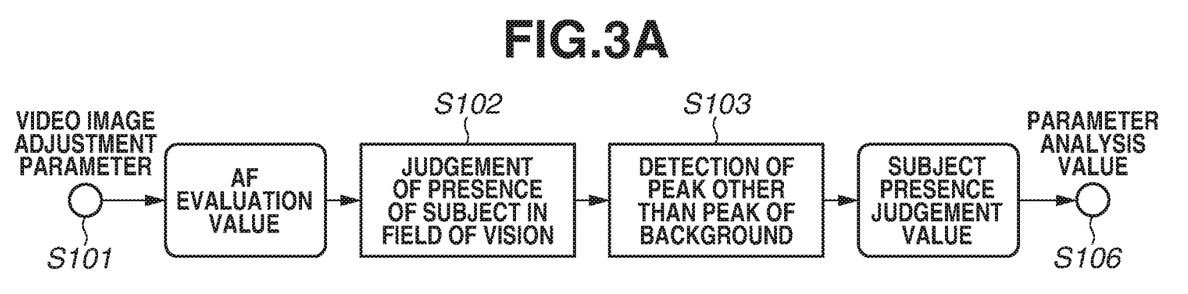
FIGS. 3A and 3B each illustrate an analysis method in a video image adjustment parameter analysis unit according to an exemplary embodiment.

Methods of analysis performed by the video image adjustment parameter analysis unit 20 will be described below with reference to FIG. 3A. FIG. 3A illustrates an analysis method in the present exemplary embodiment. In the present exemplary embodiment, first, in step S101, the video image adjustment parameters are input to the video image adjustment parameter analysis unit 20. In the present exemplary embodiment, the AF evaluation value and the exposure value Ev are input as the video image adjustment parameters. Whether a subject is present within the field of vision is judged using the AF evaluation value, and threshold value processing is performed on the exposure value Ev. In FIG. 3A, the flow of the threshold value processing performed on the exposure value Ev is omitted. In the present exemplary embodiment, whether the subject is present is judged by performing two subject presence judgments which are first and second subject presence judgment methods.

Figure 4:
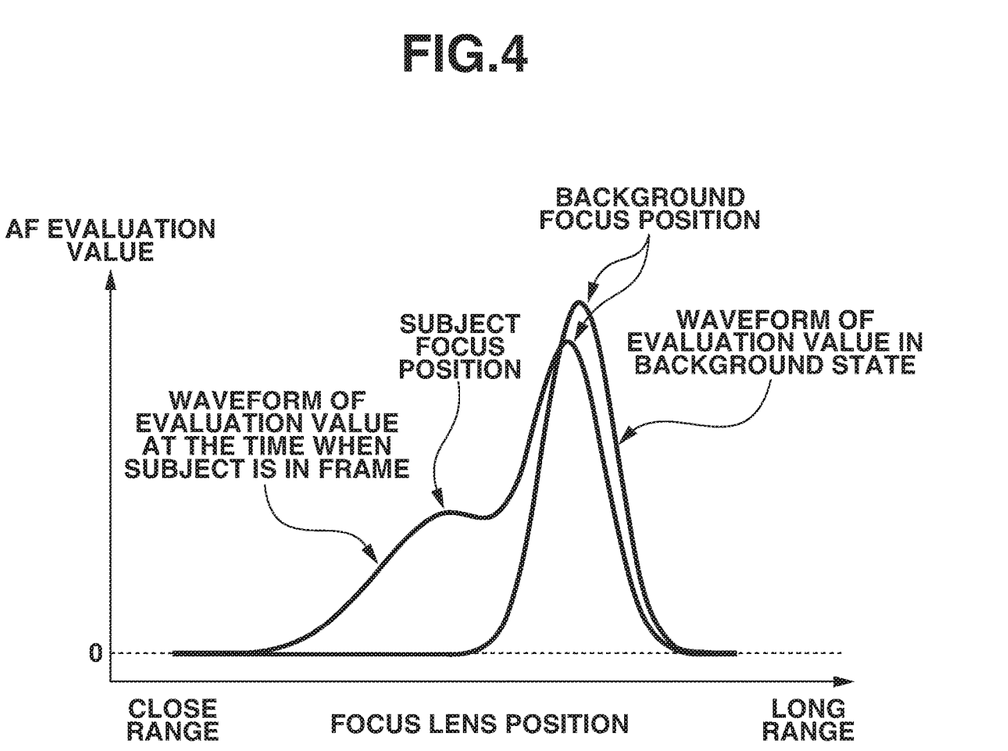
FIG. 4 illustrates a first subject presence judgment method according to the first exemplary embodiment.

First, the first subject presence judgment method (step S102) using a temporal change in the waveform of the AF evaluation value will be described below with reference to FIG. 4. FIG. 4 illustrates the waveform of the AF evaluation value in a background state, in which an image-capturing target subject is not present in the field of vision, and the waveform of the AF evaluation value in the state in which the subject is in the frame. When the subject is not present at different time points, the waveform of the AF evaluation value does not change, but once the subject comes into the frame, the waveform of the AF evaluation value becomes different from the waveform in the background state. This temporal change in the waveform of the AF evaluation value is used to judge whether the subject is present in the field of vision in the first subject presence judgment method.

As to a method for the judgment, the area of a non-common portion of the waveform of the AF evaluation value before the subject comes into the frame and the waveform of the AF evaluation value after the subject comes into the frame is calculated, and if the area becomes equal to a threshold value Th1 or more, it is judged that the subject is present. While the subject presence judgment is output using two values of present and absent in the present exemplary embodiment, the subject presence judgment can be stochastically expressed. For example, a likelihood distribution of the area of the non-common portion of the waveforms of the AF evaluation value is obtained from various situations, and the probability of the presence of the subject is calculated by Bayesian inference from prior probabilities in the background state and the state in which the subject zoomed in.

Figure 5:
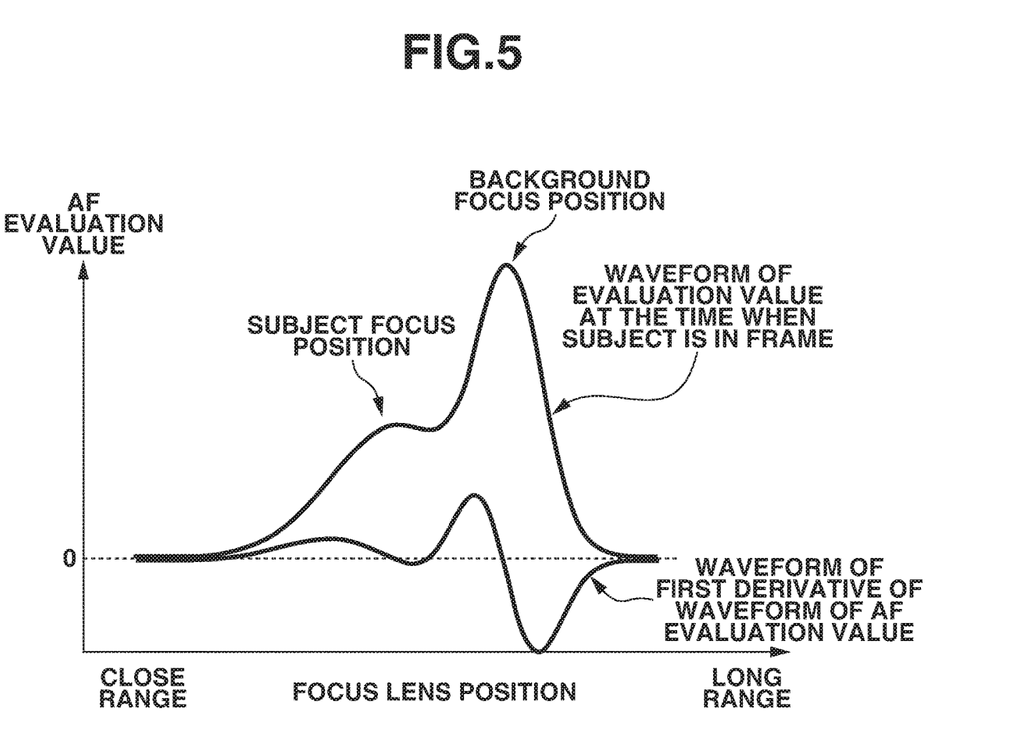
FIG. 5 illustrates a second subject presence judgment method according to the first exemplary embodiment.

However, when the subject presence judgment is performed using a temporal difference between the waveforms of the AF evaluation value, the AF evaluation value can vary due to a movement of the light source position (e.g., movement of the sun) and a change in light source intensity (e.g., morning, daytime, evening) although the subject is not present. Thus, the second subject presence judgment (step S103) based on the peak detection of the AF evaluation value is performed following the first subject presence judgment method (step S102) using the temporal change in the waveforms of the AF evaluation value in the present exemplary embodiment. FIG. 5 illustrates the second subject presence judgment based on the peak detection of the AF evaluation value.

FIG. 5 illustrates the waveform of the AF evaluation value in the state in which the subject is in the frame and also illustrates the waveform of the first derivative of the AF evaluation value. To detect focus positions from the waveform of the AF evaluation value, extrema of the waveform are detected. To detect a peak that is convex upward, a position at which the first derivative value is zero and the gradient of the first derivative of the position is negative is selected. In the state in which the subject is in the frame, a peak of the subject appears in addition to a peak of the background. Whether the subject is in the frame in the scene can be judged by judging whether the peak of the subject appears.

While the subject presence judgment based on the peak appearance judgment is output using the two values of present and absent in the present exemplary embodiment, the subject presence judgment can be expressed stochastically. For example, a method can be used in which the probability of the presence of the subject is increased if the gradient of the waveform of the first derivative at the peak position of the AF evaluation value is large.

As described above, in the present exemplary embodiment, the subject presence judgment is performed based on the temporal change in the waveform of the AF evaluation value (step S102) and the peak analysis of the waveform of the AF evaluation value (step S102) to obtain a judgment value of the judgment. Further, in the present exemplary embodiment, the video image adjustment parameter analysis unit 20 judges whether the exposure value Ev is smaller than a threshold value Th_low, or larger than a threshold value Th_high to obtain a judgment value of the judgment. The video image adjustment parameter analysis unit 20 outputs the above-described two judgment values as parameter analysis values (step S106).

Figure 6:
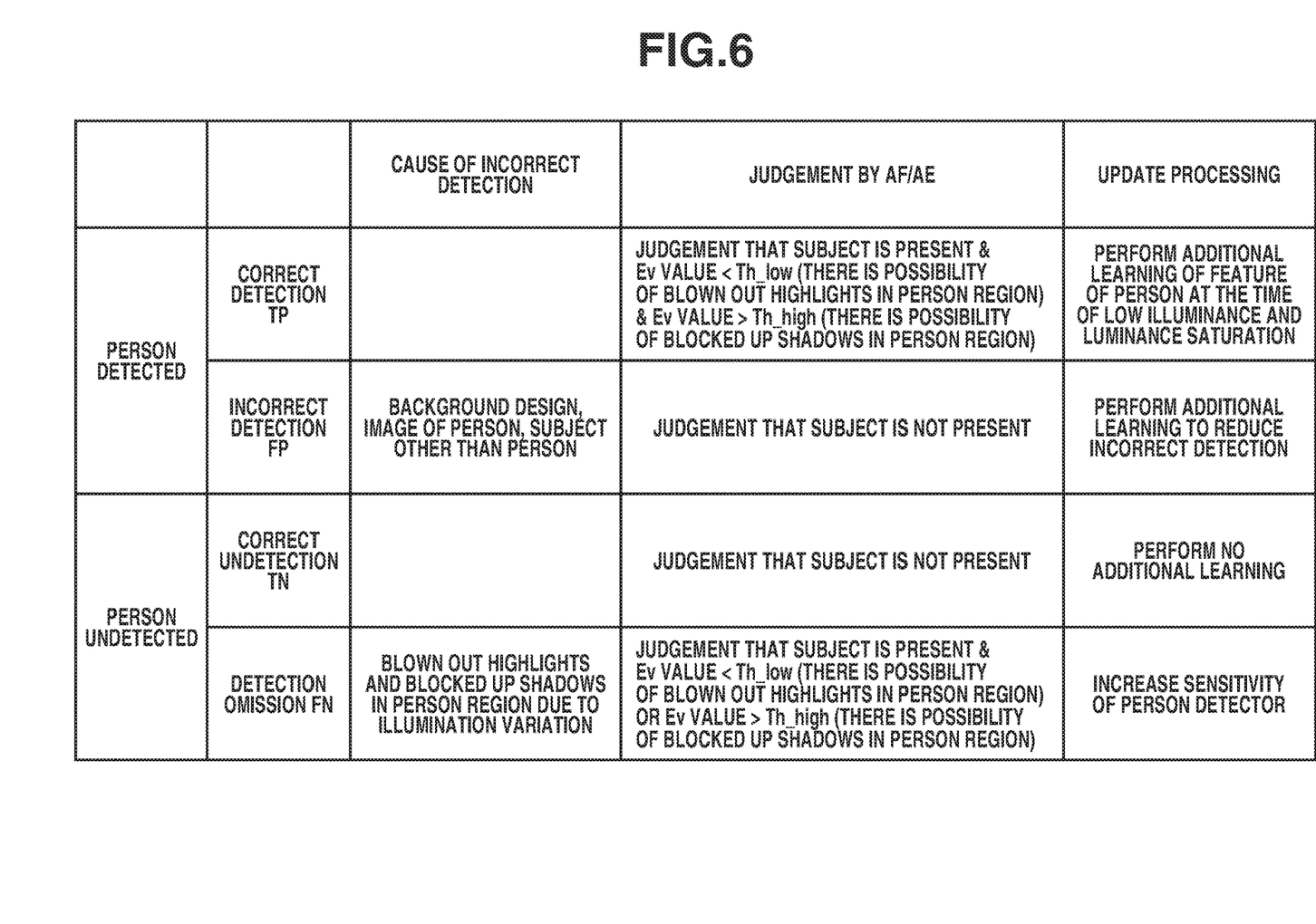
FIG. 6 is a table illustrating update rules applied at the time of performing additional learning of a classifier according to the first exemplary embodiment.

The following describes a method of autonomous learning of the classifier for person detection using the result of analysis performed by the video image adjustment parameter analysis unit 20. FIG. 6 is a table illustrating update rules applied at the time of performing additional learning of a person detector stored in the learning rule storing unit 31 in the present exemplary embodiment.

As illustrated in FIG. 6, there are four cases of person detection results. First, a person-correctly-detected case (TP: true positive) is the case in which a person is detected from a video image (image) and the detection is correct. A person-incorrectly-detected case (FP: false positive) is the case in which a person is incorrectly detected. Further, a person-correctly-undetected case (TN: true negative) is the case in which no person is detected from a video image (image) and this judgment is correct. A person-incorrectly-undetected case (FN: false negative) is the case in which there is a detection omission.

The person detector executed in the video image recognition unit 40 detects a person from input video images transmitted from the image capturing unit 10 and outputs the position and size of the detected person. At this time, the person detection results include incorrect detection results and no-detection results. Thus, the foregoing pieces of information are judged and feedback is provided to the classifier so that the classifier autonomously adapts to the image-capturing environment. Further, the performance of person detection is improved without providing a teacher signal online by a human.

As illustrated in FIG. 6, a cause of the person-incorrectly-detected case is erroneous detection of a background design or a photograph of a person. In this case, since no person is present in the image-capturing scene, the waveform of the AF evaluation image-capturing scene value is not supposed to vary temporally (no change from the background state), and no peak is supposed to be detected from the waveform of the AF evaluation value of those other than the background. Thus, if incorrect person detection occurs from the subject presence judgment value of the parameter analysis values (step S106), the incorrect detection case is added to the database stored in the learning database storing unit 32, and the classifier is re-learned to reduce incorrect detection.

On the other hand, as illustrated in FIG. 6, examples of a cause of the person-incorrectly-undetected case (detection omission) include blown out highlights of textures due to overexposure of the subject region and blocked up shadows of textures due to underexposure of the subject region. In this case, although a person is present, the person is unsuccessfully detected because sufficient feature amounts for the classifier to detect the person are not acquired, person detection is unsuccessfully performed. Since the person is present, the waveform of the AF evaluation value is supposed to vary temporally (different from the background state), and a peak is supposed to be detected from the waveform of the AF evaluation value of those other than the background.

Further, when the subject region is overexposed or underexposed, the exposure value Ev is likely to be small or large, respectively. Thus, if it is judged that a person is not detected when the person is present according to the subject presence judgment value and the exposure value Ev, first, the sensitivity of the person detector of the classifier is increased (threshold value of person detection is decreased) to enable the person to be detected. Thereafter (in subsequent frames), the correct detection case is added to the database stored in the learning database storing unit 32, and the classifier is re-learned to reduce person-incorrectly-undetected cases.

Figure 7:
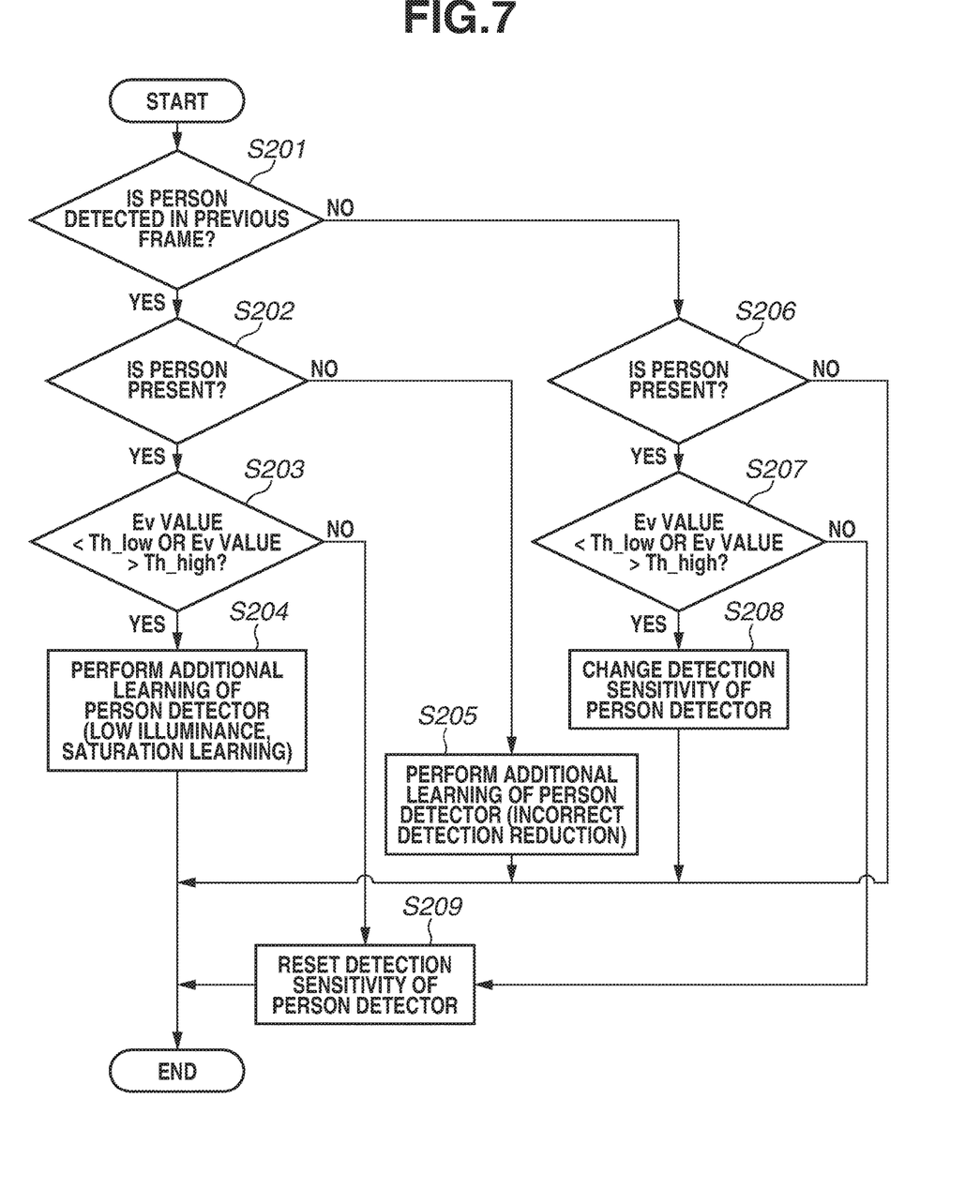
FIG. 7 is a flowchart illustrating a process of autonomous learning of a person detection classifier according to the first exemplary embodiment.

FIG. 7 is a flowchart illustrating processing of autonomous learning of the classifier of the person detection performed by the autonomous learning unit 30 according to the present exemplary embodiment. While the configuration in which autonomous learning of the classifier is performed with respect to each frame of an input video image is described in the present exemplary embodiment, the disclosure is not limited to the configuration, and the autonomous learning can be performed with respect to every several frames.

First, in step S201, the autonomous learning unit 30 receives a result of person detection performed by the video image recognition unit 40 on the previous frame. If a person is detected (YES in step S201), then in step S202, a result of person presence judgment based on the temporal analysis (step S102) and peak detection (step S103) of the waveform of the AF evaluation value among the parameter analysis values (step S106) is referred to. In step S202, if the person is present (YES in step S202), the processing proceeds to step S203. In step S203, a result of judgment of whether the exposure value Ev, among the parameter analysis values (step S106), is smaller than the threshold value Th_low, or larger than the threshold value Th_high is referred to, and whether the exposure is appropriate is judged.

If the exposure is not appropriate (YES in step S203), the processing proceeds to step S204, and additional learning of the person detector is performed. On the other hand, if the exposure is appropriate (NO in step S203), it is judged that the person detection is within an appropriate exposure range (i.e., within a predetermined range), and thus additional learning of the person detector is not performed. Then, in step S209, the detection sensitivity of the person detector is reset. In this way, if it is judged that the exposure is not appropriate in step S207 described below (YES in step S207), then in step S208, the detection sensitivity of the person detector is increased so that an undetected target (person) can be detected. Thus, if the illumination condition is improved (exposure becomes appropriate) in the next and subsequent frames and the exposure is judged as being appropriate in step S207 (NO in step S207), the current detection sensitivity leads to excessive detection, so the detection sensitivity is reset in step S209.

In the present exemplary embodiment, the method in which the correct case is added to the learning database storing unit 32 to re-learn the learner is described as an example of an additional learning method. Alternatively, the classifier in the current frame is determined as an initial classifier to generate a plurality of classifiers having different properties from the initial classifier, and classifier updating is performed using results of person detection by the classifiers to perform autonomous re-learning as discussed in A. Gaidon, G. Zen, and J. A. Rodriguez-Serrano, "Self-Learning Camera: Autonomous Adaptation of Object Detectors to Unlabeled Video Streams", arXiv:1406.4296v2 [cs.CV] 18 Jun. 2014. The foregoing process corresponds to a process for the person-correctly-detected (TP) case.

Next, a process for the person-incorrectly-detected case (FP) will be described below. In this case, in step S201, it is judged that the person is detected in the previous frame (YES in step S201), and the processing proceeds to step S202. In step S202, a result of person presence judgment based on the temporal analysis (step S102) and peak detection (step S103) of the waveform of the AF evaluation value is referred to. In step S202, it is judged that the person is not present (NO in step S202), so the result of person detection in step S201 is highly likely an incorrect detection. In the person-incorrectly-detected (FP) case, the incorrect detection case is added to the learning database storing unit 32 in step S205, and the person detector is re-learned to reduce incorrect detection.

Next, a process for the person-correctly-undetected (TN) case will be described below. First, in step S201, the person is not detected in the previous frame (NO in step S201), and the processing proceeds to step S206 to refer to the person presence judgment result as in step S202. In the person-correctly-undetected (TN) case, it is judged that the person is not present also in step S206 (NO in step S206), and the processing proceeds to the next frame without performing re-learning.

Lastly, a process for the person detection omission (FN) case will be described below. In the person detection omission (FN) case, although the person is not detected in the previous frame in step S201 (NO in step S201), it is judged that the person is present in step S206 (YES in step S206). Thus, the processing proceeds to step S207, and whether the exposure is appropriate is judged by referring to the result of judgment of whether the exposure value Ev, among the parameter analysis values (step S106), is smaller than the threshold value Th_low or larger than the threshold value Th_high. If it is judged that the exposure is not appropriate (YES in step S207), it is highly likely that the person is undetected. Thus, in this case, the sensitivity of the person detector is increased in step S208 to enable the video image recognition unit 40 to detect the person in the undetected state.

On the other hand, if the exposure value Ev is within the appropriate range (larger than or equal to the threshold value Th_low and smaller than or equal to the threshold value Th_high) (NO in step S207), the person detection omission judgment is suspended, and re-learning is not performed. Then, in step S209, the detection sensitivity of the person detector is reset.

A possible case in which the judgment is suspended as described above is a case in which the classifier is unable to detect a person when the posture of the person in an input video image is complicated in a case in which the person detector is learned using a database including mainly cases of upright walking. As used herein, the term "complicated posture" refers to, for example, a squat or running with a broad movement of arms and legs. In such cases, the waveform of the AF evaluation value indicates that the person is present, and this does not match the result output by the classifier. In this case, the classifier does not output the person detection region, so the learning database storing unit 32 and the classifier cannot be updated. Thus, it may be an option to use a method of generating a plurality of classifiers having different properties from an initial classifier as in the method discussed in N. Dalal, B. Triggs, "Histograms of Oriented Gradients for Human Detection", CVPR2005 (IEEE Computer Vision and Pattern Recognition), Vol. 1, pp. 886-893, 2005.

As described above, in the present exemplary embodiment, the learning database and the classifier are updated using the results of temporal analysis and peak analysis of the waveform of the AF evaluation value, the result of threshold value judgment of the exposure value Ev, and the result of person detection by the classifier to enable autonomous additional learning and re-learning of the person detection function. Especially, in the present exemplary embodiment, additional learning of the person detection classifier is performed using video image signal adjustment parameters (waveform of AF evaluation value, exposure value Ev) for correcting captured video images, so video image recognition is performed with high accuracy without being affected by illumination variations of the image-capturing environment.

Next, the second exemplary embodiment of the disclosure will be described below. In the present exemplary embodiment, an example of video image recognition in which a movement of a person is recognized from an input video image, especially an example in which an abnormal movement (specific movement) is detected, will be described. Components that are already described above in the first exemplary embodiment are given the same reference numerals, and description thereof is omitted.

The configuration of the video image recognition apparatus 100 according to the present exemplary embodiment is basically similar to that according to the first exemplary embodiment, except that the AWB control unit 83 in the present exemplary embodiment transmits a white balance correction gain to the video image adjustment parameter analysis unit 20. As described below, the judgment of the presence/absence of illumination variation can be performed without the use of the white balance correction gain, and in this case, the white balance correction gain does not need to be transmitted to the video image adjustment parameter analysis unit 20.

Figure 3B:
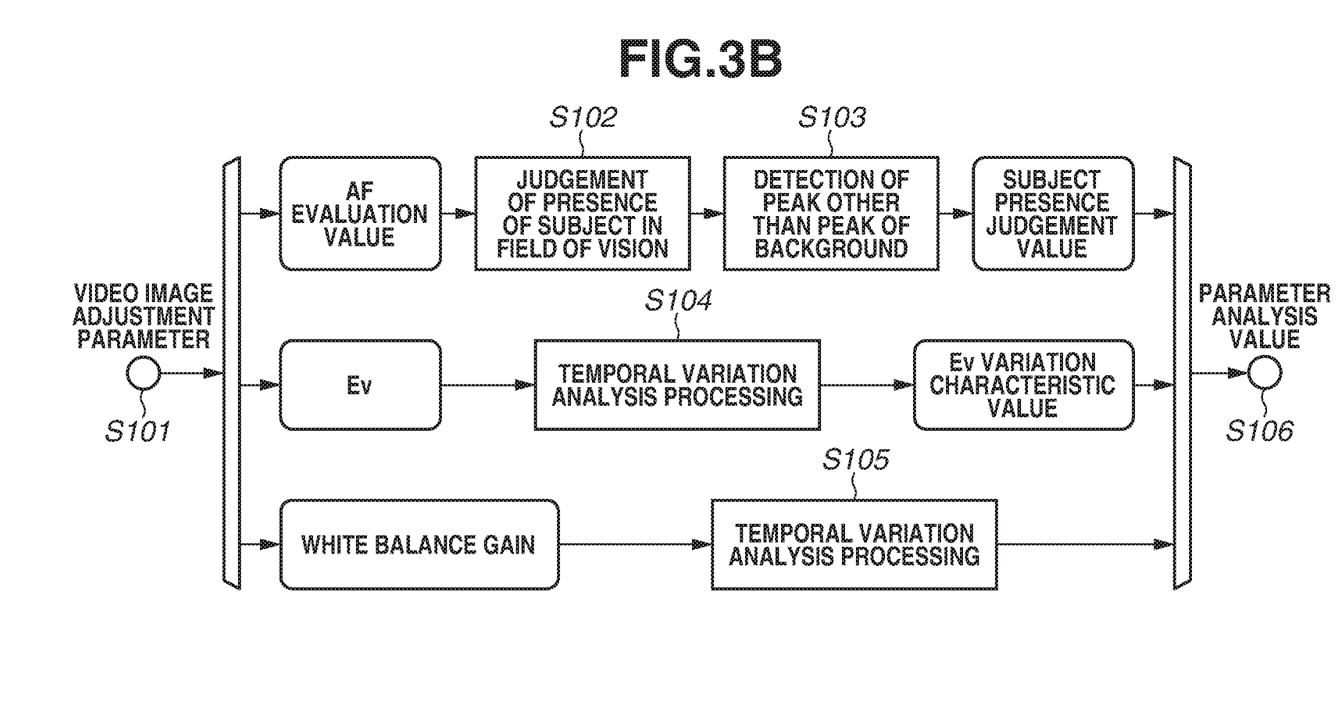

FIG. 3B illustrates a method of analysis in the video image adjustment parameter analysis unit 20 in the present exemplary embodiment. In the present exemplary embodiment, at least one of the temporal variation analysis of the exposure value Ev (step S104) and the temporal variation analysis of the white balance correction gain (step S105) is performed in addition to the analysis of the waveform of the AF evaluation value (steps S102 and S103). The threshold value processing on the exposure value Ev is performed also in the present exemplary embodiment, but this is omitted in FIG. 3B.

Figure 8:
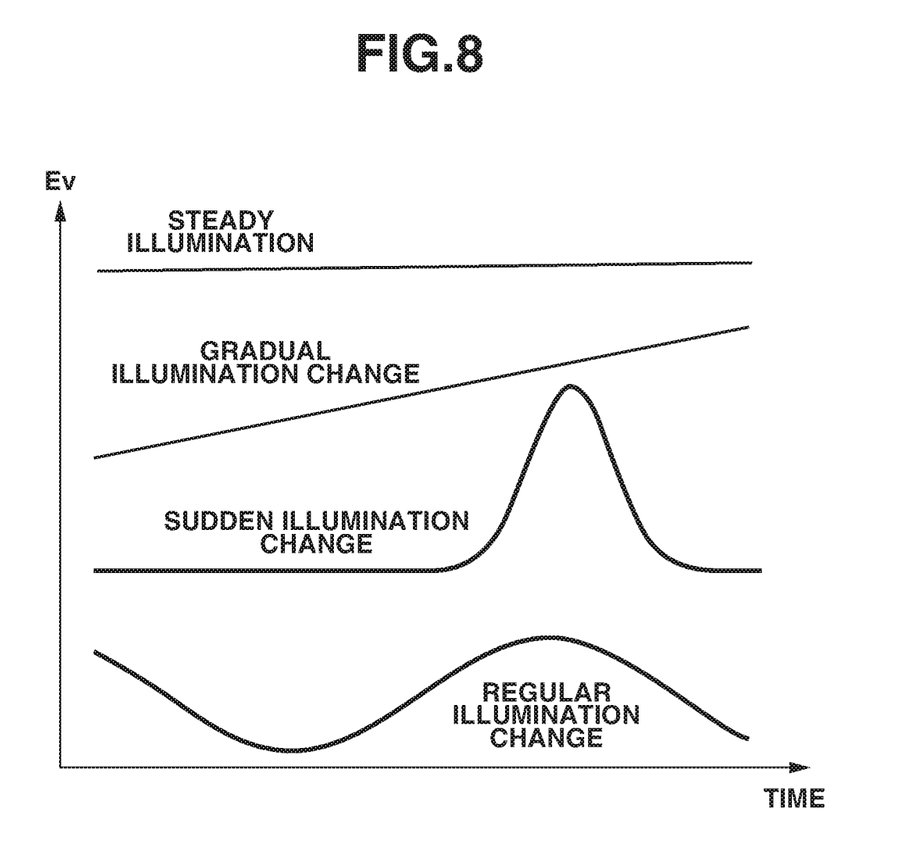
FIG. 8 illustrates analysis processing for analyzing temporal variations in an exposure value Ev according to a second exemplary embodiment.

In the person movement recognition, in general, the amounts of change (derivative values) in space and time directions in luminance signals or color signals from a moving image are often used. It is known that the derivative values of the time and space and similar features form a distribution in a feature amount space correspondingly to the type of human movement (refer to Japanese Patent Application Laid-Open No. 2007-219865). A classifier for movement recognition is configured by machine learning of the feature amounts. The time-space derivative information, however, is affected significantly by illumination variations, so an extreme illumination variation can cause incorrect movement recognition. Thus, an illumination variation is judged based on the temporal variation analysis of the exposure value Ev (step S104), and the judgment result is reflected in the additional learning of the classifier to enable autonomous learning of movement recognition. FIG. 8 illustrates the analysis processing for analyzing temporal variation in the exposure value Ev (step S104). The horizontal axis of the graph in FIG. 8 represents the time, and the vertical axis represents the exposure value Ev. When the illumination is in a steady state, the exposure value Ev remains a constant value. When the illumination condition gradually changes, the exposure value Ev also changes at a constant change rate, but the exposure of the entire scene and the exposure of the subject region are kept stable by automatic AE control.

However, when the illumination condition changes within a short period of time or changes regularly, the time-space derivative values of the luminance signal vary significantly, and this often leads to incorrect movement recognition. Examples of a cause of a change in the illumination condition within a short period of time include outside light entering an indoor environment as a result of opening a door.

Thus, to analyze the temporal variation of the exposure value Ev, the first and second derivatives of time-series signals of the exposure value Ev are calculated. The first derivative value indicates the rate of change in illumination variation, and a larger first derivative value indicates a more significant change in the illumination condition. Further, the second derivative value indicates the acceleration of the illumination variation, and the variation state of the illumination condition is detectable also from the second derivative value. Further, a zero-crossing point of the second derivative value is detected to detect the maximum value of the rate of change in illumination variation. The information about the first and second derivatives of the waveform of the exposure value Ev corresponds to a sudden change in illumination condition in a short period of time and, thus, can be used as rule information at the time of re-learning or additional learning of the classifier for movement recognition.

A case in which the illumination changes suddenly as specified by the third waveform from the top in FIG. 8 will be described in detail below as an example. The waveform indicates an example of a case in which outside light enters in a steady illumination environment. Outside light enters, and after the exposure value Ev increases in a short period of time, the original illumination condition is returned. The position of the waveform at which the exposure value Ev is changed suddenly can be detected as a case in which the first derivative value of the waveform of the exposure value Ev is detected as a case in which the first derivative value exceeds a threshold value.

Further, in the case in which the waveform of the exposure value Ev has a peak as in the above-described example, a sudden change in illumination can be detected also by detecting the zero crossing point of the first derivative of the waveform of the exposure value Ev. The fact that the zero crossing point is detected also indicates that the illumination condition is changed in a short period of time. In this case, a movement classifier using temporal and spatial derivative values of the luminance can make incorrect recognition. Thus, when the waveform of the exposure value Ev becomes equal to a threshold value or larger or when a zero crossing point of the first derivative of the waveform of the exposure value Ev is detected, it is judged that there is such an illumination variation, and this is output as a judgment value. While a result of one of two values indicating the presence or absence of illumination variation is output as the judgment value in the present exemplary embodiment, the probability of illumination variation can be obtained and output as the judgment value.

While the judgment value of the illumination variation is obtained using the sudden change in the exposure value Ev within the short period of time in the above description, the judgment value can also be obtained by similar processing using a temporal variation in the white balance. Further, additional learning of the abnormal movement (specific movement) can be performed using information about sudden changes in both the exposure value Ev and the white balance. In this case, the sudden change in illumination condition can be judged by calculating first and second partial derivatives of two-dimensional vectors of the exposure value Ev and the white balance. In any case, at least one of the temporal variation analysis (step S104) of the exposure value Ev and the temporal variation analysis (step S105) of the white balance correction gain is performed and a result of judgment of whether there is an illumination variation is output in the present exemplary embodiment.

Further, in the present exemplary embodiment, whether the variation amount of the exposure value Ev is larger than or equal to a threshold value Th_var is judged as the threshold value processing with respect to the exposure value Ev to determine whether the exposure variation is within a normal range, and a result of the determination is output as one of the parameter analysis values (step S106).

Figure 9:
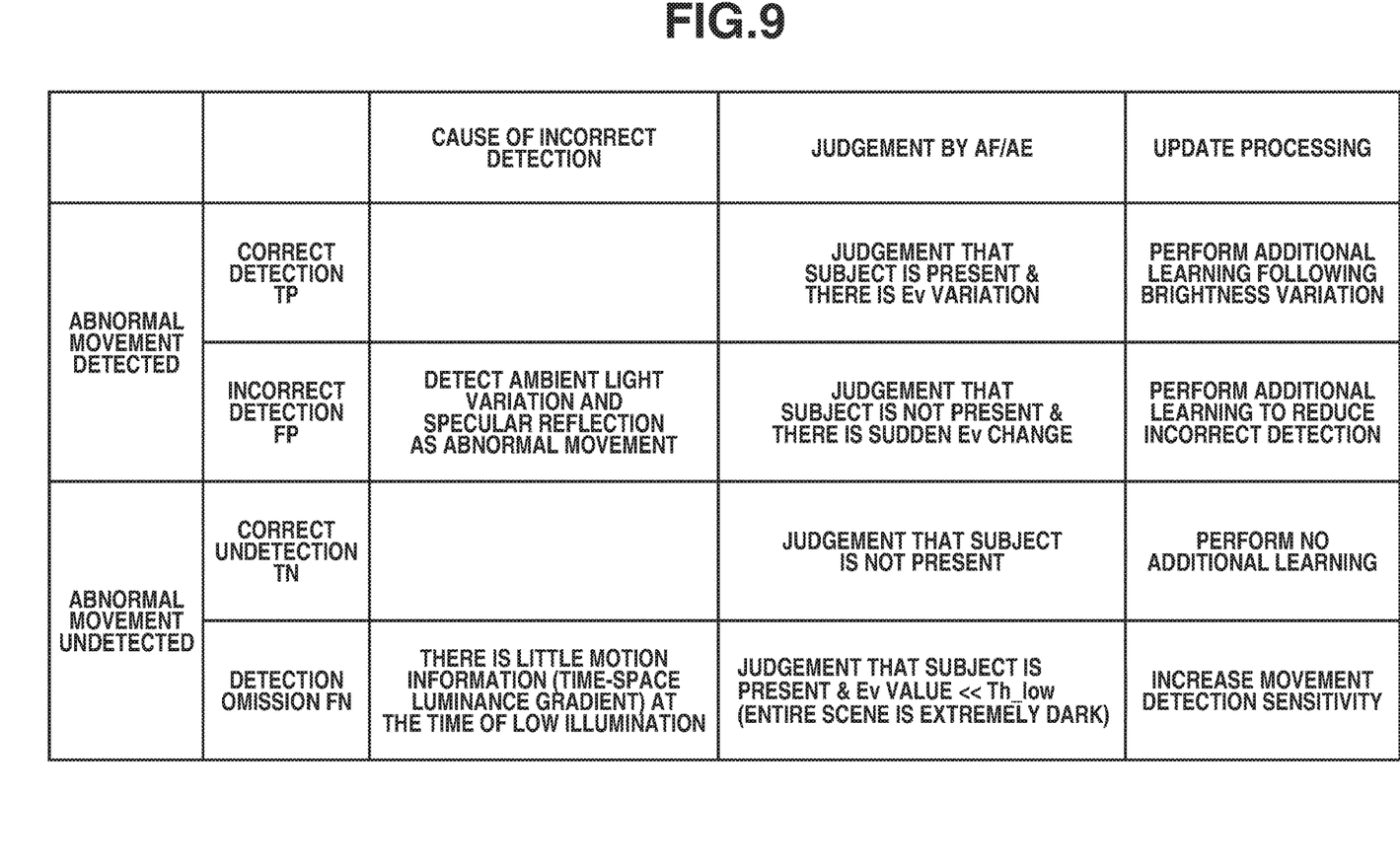
FIG. 9 is a table illustrating update rules applied at the time of performing additional learning of a classifier according to the second exemplary embodiment.

FIG. 9 is a table illustrating update rules applied at the time of performing additional learning of a classifier for person movement recognition which is stored in the learning rule storing unit 31 in the present exemplary embodiment. As illustrated in FIG. 9, in the person movement recognition, there are four cases of recognition results. First, an abnormal-movement-correctly-detected case (TP: true positive) is the case in which an abnormal movement is detected from an input video image (image) and the detection is correct, and an abnormal-movement-incorrectly-detected case (FP: false positive) is the case in which a movement is incorrectly detected. Further, an abnormal-movement-correctly-undetected case (TN: true negative) is the case in which no abnormal movement is detected from a video image and this judgment is correct, and an abnormal-movement-incorrectly-undetected case (detection omission) (FN: false negative) is the case in which no abnormal movement is detected from a video image and this judgment is incorrect.

As illustrated in FIG. 9, a cause of the abnormal-movement-incorrectly-detected case is ambient light variations or specular reflection or the like generated with large luminance variations in response to the ambient light variations. In this case, no person is present in the image-capturing scene, so the waveform of the AF evaluation value does not vary temporally (basically the waveform does not change from the background state, but the edge intensity is increased by specular reflection, and this can increase the peak value). Further, no peak of the waveform of the AF evaluation value other than the background is supposed to be detected. Thus, if an abnormal movement is detected when it is judged that no person is present from the subject presence judgment value, the abnormal-movement-incorrectly-detected case is added to the learning database stored in the learning database storing unit 32, and the classifier is re-learned to reduce incorrect detection.

On the other hand, examples of a cause of the abnormal-movement-incorrectly-undetected case include an illumination which is so dark that sufficient time-space luminance gradient information expressing motion information is not acquired. In this case, as in the first exemplary embodiment, the sensitivity of the abnormal movement classifier is increased, and after the abnormal movement is detected, the correctly-detected case is added to the database stored in the learning database storing unit 32, and the classifier is re-learned to reduce undetected abnormal movements.

Figure 10:
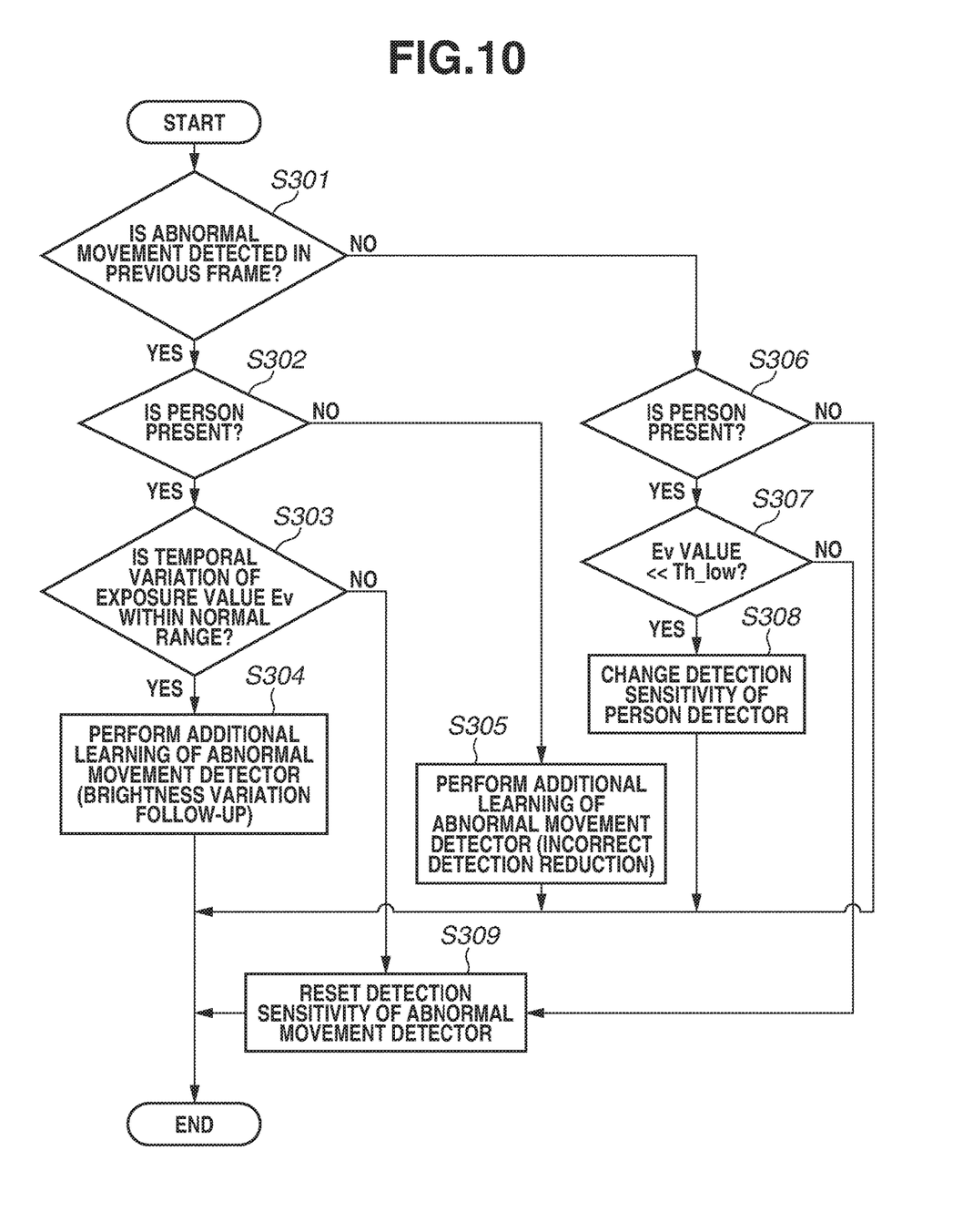
FIG. 10 is a flowchart illustrating a process of autonomous learning of a movement recognition classifier according to the second exemplary embodiment.

FIG. 10 is a flowchart illustrating processing of autonomous learning of the person movement recognition classifier performed by the autonomous learning unit 30 according to the present exemplary embodiment. While the configuration in which autonomous learning of the classifier is performed with respect to each frame of an input video image is described in the present exemplary embodiment, the disclosure is not limited to the configuration, and the autonomous learning can be performed with respect to every several frames.

First, in step S301, the autonomous learning unit receives a result of person movement recognition performed by the video image recognition unit 40 on the previous frame. If the abnormal movement is detected (YES in step S301), the processing proceeds to step S302. In step S302, a result of person presence judgment based on the temporal analysis (step S102) and peak detection (step S103) of the waveform of the AF evaluation value is referred to. In step S302, if the person is present (YES in step S302), the processing proceeds to step S303. In step S303, a judgment result of temporal change analysis of the exposure value Ev among the parameter analysis values (step S106) is referred to, and whether the temporal variation of exposure is within a normal range is determined.

If the temporal variation is within the normal range (YES in step S303), then in step S304, additional learning of the abnormal movement detector is performed. On the other hand, if the temporal variation is not within the normal range (NO in step S303), it is judged that the abnormal movement is detected with exposure variations within the normal range, and additional learning of the abnormal movement detector is not performed. Then, in step S309, the detection sensitivity of the abnormal movement detector is reset as described below. The detection sensitivity of the detector is reset in order to prevent excessive detection when the illumination condition is improved, as in the first exemplary embodiment.

In the present exemplary embodiment, the method in which the correct case is added to the learning database storing unit 32 to re-learn the learner is described as an example of an additional learning method. Alternatively, the classifier in the current frame is determined as an initial classifier to generate a plurality of classifiers having different properties from the initial classifier, and classifier updating is performed using results of person detection by the classifiers to perform autonomous re-learning as discussed in A. Gaidon, G. Zen, and J. A. Rodriguez-Serrano, "Self-Learning Camera: Autonomous Adaptation of Object Detectors to Unlabeled Video Streams", arXiv:1406.4296v2 [cs.CV] 18 Jun. 2014. The foregoing process corresponds to a process for the person-correctly-detected (TP) case.

Next, a process for the abnormal-movement-incorrectly-detected case (FP) will be described below. First, in step S301, it is judged that the abnormal movement is detected in the previous frame (YES in step S301), and the processing proceeds to step S302. In step S302, it is judged that the person is not present (NO in step S302) in the person presence judgment based on the temporal analysis (step S102) and peak detection (step S103) of the waveform of the AF evaluation value, and it is judged that the result of abnormal movement detection is highly likely incorrect detection. In the abnormal-movement-incorrectly-detected case (FP), the incorrectly-detected case is added to the learning database storing unit 32 in step S305, and additional learning of the abnormal movement detector is performed to reduce incorrect detection.

Next, a process for the abnormal-movement-correctly-undetected case (TN) will be described below. In step S301, the abnormal movement is not detected in the previous frame (NO in step S301), and the processing proceeds to step S306. In step S306, whether the person is present is judged as in step S302. In the case of the abnormal-movement-correctly-undetected case (TN), it is judged that the person is not present in step S306. Then, re-learning is not performed, and the processing proceeds to the next frame without performing re-learning.

Lastly, a process for the abnormal-movement-detection omission case (FN) will be described below. In step S301, the abnormal movement is not detected in the previous frame (NO in step S301), but in step S306, it is judged that the person is present based on the analysis result of person presence judgment (YES in step S306). Then, the processing proceeds to step S307, and a result of threshold value judgment of the exposure value Ev (the exposure value Ev is significantly smaller than the threshold value Th_low) is referred to among the parameter analysis values (step S106). In step S307, if it is judged that the exposure value Ev is significantly smaller than the threshold value Th_low (YES in step S307), there is a high possibility that the abnormal movement is undetected. In such a case, in step S308, the sensitivity of the abnormal movement detector is increased to enable the video image recognition unit 40 to detect the undetected abnormal movement.

On the other hand, in step S307, if it is judged that the exposure value Ev is not significantly smaller than the threshold value Th_low (NO in step S307), i.e., if it is judged that the exposure value Ev is within the appropriate range, the abnormal movement detection omission judgment is suspended, and re-learning is not performed. Then, in step S309, the detection sensitivity of the abnormal movement detector is reset.

As described above, in the present exemplary embodiment, the learning database and the classifier are updated using the results of temporal analysis and peak analysis of the waveform of the AF evaluation value, the result of threshold value judgment of the exposure value Ev, variation amount analysis of the exposure value Ev, and the result of abnormal movement detection by the classifier. Especially, in the present exemplary embodiment, additional learning of the abnormal movement detection classifier is performed using the video image signal adjustment parameters (waveform of AF evaluation value, exposure value Ev, white balance) for captured video image correction. Thus, video image recognition is performed with high accuracy without being affected by illumination variations of the image-capturing environment.

In the above-described exemplary embodiments, the rules for autonomous learning of the classifier are determined using the result of person or abnormal movement detection and the analysis result of the video image adjustment parameters. Alternatively, instead of determining such learning rules, a method can be used in which a person feature (feature for person detection or movement recognition) is linked with the video image adjustment parameters to use them as a single feature amount to perform learning directly.

Further, in the above-described exemplary embodiments, two examples that are the person detection and abnormal movement detection are described as examples of autonomous learning of the classifier. The rules for executing autonomous learning differ for each recognition environment and each recognition target, and the rules are changed according to a user request to improve the accuracy of autonomous learning. For example, a sudden change in the exposure value Ev occurs when the illumination is turned on/off in an indoor environment, whereas a sudden change in the exposure value Ev occurs due to the movement of shadows generated by clouds in an outdoor environment. The difference between the environments is reflected in the learning rules, and the learning rules are changed according to the environment in which the camera is located so that the efficiency of autonomous learning is improved.

The settings of the learning rules can be changed on a setting unit, especially a user interface displayed on a video image display system at the time of placing the camera. The learning rules are changed on the user interface so that the settings of learning rules for a plurality of cameras can be set collectively via a network especially in the cases of Internet Protocol (IP) network cameras.

The aspect of the embodiments enables highly accurate video image recognition without being affected by illumination variations in an environment in which image capturing is performed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-004680, filed Jan. 13, 2017, which is hereby incorporated by reference herein in its entirety.

What is claimed is:
1. An apparatus comprising:
one or more processors; and
at least one memory coupled to the one or more processors storing instructions which, when executed by the one or more processors, cause the one or more processors to function as:
an analysis unit configured to perform analysis a state of an environment at a time when an image capturing unit captures a video image, based on a parameter for correcting the captured video image, wherein the parameter includes an auto focus (AF) evaluation value of the image capturing unit and to determine of whether a person is present in the video image is performed in the analysis based on a waveform of the AF evaluation value;
a recognition unit configured to perform recognition including person detection from the captured video image, using a classifier; and a learning unit configured to learn the classifier based on a result of the analysis and a result of the recognition.

2. The apparatus according to claim 1, wherein, in a case where the analysis unit judges that the person is not present in the video image when the recognition unit detects the person in the video image, the learning unit learns the classifier based on the video image and a result of the judgement performed by the analysis unit.

3. The apparatus according to claim 1,
wherein the parameter includes an exposure value of the image capturing unit, and
wherein the analysis unit judges whether the exposure value is within a predetermined range.

4. The apparatus according to claim 3, wherein, in a case where the analysis unit judges that the person is not present in the video image and the exposure value is not within the predetermined range when the recognition unit detects the person in the video image, the learning unit learns the classifier based on the video image and a result of the judgement performed by the analysis unit.

5. The apparatus according to claim 3, wherein, in a case where the analysis unit judges that the person is present in the video image and the exposure value is not within the predetermined range when the recognition unit detects no person in the video image, the learning unit increases detection sensitivity of person detection performed by the classifier.

6. The apparatus according to claim 5, wherein, in a case where the analysis unit judges that the exposure value is within the predetermined range after the learning unit increases the detection sensitivity of the classifier, the detection sensitivity is reset.

7. The apparatus according to claim 1, wherein the recognition unit further includes detection of a specific movement of a person from the video image.

8. The apparatus according to claim 7, wherein the recognition unit detects as the specific movement of the person an abnormal movement of the person based on an exposure value of the image capturing unit and a white balance.

9. The apparatus according to claim 7,
wherein the parameter includes an auto focus (AF) evaluation value of the image capturing unit, and
wherein the analysis unit judges whether the person is present in the video image based on a waveform of the AF evaluation value.

10. The apparatus according to claim 1, wherein, in a case where the analysis unit determines that the person is not present in the video image when the specific movement of the person in the video image is detected in the recognition, the classifier is learned based on the video image and a result of the determination.

11. The apparatus according to claim 10,
wherein the parameter includes at least one of an exposure value of the image capturing unit and a white balance correction value, and
wherein the analysis unit judges whether there is a temporal variation in at least one of the exposure value and the white balance correction value.

12. The apparatus according to claim 11, wherein, in a case where the analysis unit judges that the person is not present in the video image and there is a temporal variation in at least one of the exposure value and the white balance correction value when the recognition unit detects the specific movement of the person in the video image, the learning unit learns the classifier based on the video image and a result of the judgement performed by the analysis unit.

13. The apparatus according to claim 10,
wherein the parameter includes an exposure value of the image capturing unit, and
wherein the analysis unit judges whether the exposure value is smaller than a threshold value.

14. The apparatus according to claim 13, wherein, in a case where the analysis unit judges that the person is present in the video image and the exposure value is smaller than the threshold value when the recognition unit does not detect the specific movement of the person in the video image, the learning unit increases sensitivity of the specific movement detection performed by the classifier.

15. The apparatus according to claim 14, wherein, in a case where the analysis unit judges that the exposure value is larger than the threshold value after the learning unit increases the detection sensitivity of the classifier, the detection sensitivity is reset.

16. The apparatus according to claim 1,
wherein the learning unit stores for each target of the recognition processing a plurality of rules for learning the classifier, and
wherein the video image recognition apparatus further comprises a setting unit configured to set the plurality of rules for each target of the recognition processing.

17. A method comprising:
performing analysis of a state of an environment at a time when a capturing unit captures a video image, based on a parameter for correcting the captured video image, wherein the parameter includes an auto focus (AF) evaluation value of the image capturing unit and determination of whether a person is present in the video image is performed in the analysis based on a waveform of the AF evaluation value;
performing recognition including person detection from the captured video image, using a classifier; and
learning the classifier based on a result of the analyzing and a result of the recognition.

18. A non-transitory storage medium storing a program for causing a computer to execute a method comprising:
performing analysis of a state of an environment at a time when a capturing unit captures a video image, based on a parameter for correcting the captured video image, wherein the parameter includes an auto focus (AF) evaluation value of the image capturing unit and determination of whether a person is present in the video image is performed in the analysis based on a waveform of the AF evaluation value;
performing recognition including person detection from the captured video image, using a classifier; and
learning the classifier based on a result of the analyzing and a result of the recognition.

* * * * *